(12) United States Patent
Gilbert et al.

(10) Patent No.: US 7,114,344 B2
(45) Date of Patent: Oct. 3, 2006

(54) AIR CONDITIONER ACCESS AND SERVICE FITTINGS

(75) Inventors: Major H. Gilbert, Gladys, VA (US); Jeffrey A. Schultz, Pittsville, VA (US)

(73) Assignee: Schrader-Bridgeport International, Inc., Denver, CO (US)

( * ) Notice: Subject to any disclaimer, the term of this patent is extended or adjusted under 35 U.S.C. 154(b) by 242 days.

(21) Appl. No.: 10/615,509

(22) Filed: Jul. 7, 2003

(65) Prior Publication Data

US 2004/0129013 A1 Jul. 8, 2004

Related U.S. Application Data

(60) Provisional application No. 60/394,002, filed on Jul. 5, 2002.

(51) Int. Cl.
F25B 45/00 (2006.01)
F25D 19/00 (2006.01)

(52) U.S. Cl. .......................................... 62/292; 62/299

(58) Field of Classification Search .................. 62/292, 62/299, 77; 137/614.18, 624.18; 251/149.9, 251/221, 225

See application file for complete search history.

(56) References Cited

U.S. PATENT DOCUMENTS

| 4,488,704 A * | 12/1984 | Wicker ........................ 251/265 |
| 5,887,619 A * | 3/1999 | Keary ..................... 137/614.18 |
| 6,273,397 B1 * | 8/2001 | Schultz et al. ........... 251/149.6 |
| 6,719,003 B1 * | 4/2004 | Schroeder et al. .......... 137/322 |

* cited by examiner

*Primary Examiner*—Mohammad M. Ali
(74) *Attorney, Agent, or Firm*—Brinks Hofer Gilson & Lione

(57) ABSTRACT

An air conditioner service fitting is provided and includes a valve body comprising a threaded bore and an annular valve seat extending around the bore. The valve body is configured and the valve seat is positioned such that all fluid that passes through the bore crosses the valve seat. A twist-to-open valve is disposed in the bore and threadedly engages with the valve body. The twist-to-open valve includes a valve element configured to form a polymer-to-metal seal with the valve seat. The polymer-to-metal seal stops substantially all fluid flow through the bore and the flow path when the twist-to-open valve is closed. The valve body further includes an external connection feature disposed around the bore. The valve body comprises an external sealing surface.

24 Claims, 4 Drawing Sheets

AIR CONDITIONER ACCESS AND SERVICE FITTINGS

RELATED APPLICATIONS

This non-provisional application claims the benefit of and incorporates by reference, in its entirety, U.S. provisional application Ser. No. 60/394,002, filed on Jul. 5, 2002.

BACKGROUND

The present invention relates to improved fittings for air conditioning systems, and in particular to fittings that provide low leakage rates.

Modern air conditioning systems, such as those used on automotive vehicles, are typically provided with one or more access fittings used to charge, reclaim and service the refrigerant within the system. Such access fittings preferably provide extremely low leakage rates when closed, but they can be opened easily when needed for routine service operations.

One prior-art approach to air conditioner access fittings is to use a spring-loaded valve core that provides an elastomer-to-metal seal. Such fittings are disclosed in the following U.S. patents: Gilbert U.S. Pat. No. 4,979,721 (assigned to the assignee of the present invention), Manz U.S. Pat. No. 5,080,132, Hale U.S. Pat. No. 5,010,743, Starr U.S. Pat. No. 4,753,267, Mullins U.S. Pat. No. 3,996,745, and Rawlins U.S. Pat. No. 3,645,496.

Although such access fittings have been found suitable for a wide variety of applications, the minimum leakage rate of refrigerant is limited by the rate at which refrigerant diffuses through the elastomeric sealing element of the valve core. Access fittings such as those described in the above-identified Gilbert patent include a quick release shoulder on an exterior surface of the valve body.

Metal-to-metal valves are known to the art, as described for example in Mitchell U.S. Pat. No. 5,915,402 and Taylor U.S. Pat. No. 4,932,434. However, these metal-to-metal valves are not illustrated as adapted for use with quick connect couplers, and thus they are not well suited for use as refrigerant access fittings intended for use with quick connect couplers.

SUMMARY

The present invention is directed to a low leakage air conditioner access valve that is well suited for use with quick-connect couplers.

An air conditioner access fitting is provided having a valve body with a threaded bore and an annular valve seat extending around the bore. The valve body is configured and the valve seat is positioned such that all fluid that passes through the bore crosses the valve seat. A twist-to-open valve is disposed in the bore and threadedly engaged with the valve body. The twist-to-open valve includes a valve element configured to form a polymer-to-metal seal with the valve seat. The polymer-to-metal seal stops substantially all fluid flow through the bore and the flow path when the twist-to-open valve is closed. The valve body further includes a quick-connect shoulder disposed around the bore.

According to another aspect of the invention, an air conditioner service fitting is provided and includes a valve body comprising a threaded bore and an annular valve seat extending around the bore. The valve body is configured and the valve seat is positioned such that all fluid that passes through the bore crosses the valve seat. A twist-to-open valve is disposed in the bore and threadedly engages with the valve body. The twist-to-open valve includes a valve element configured to form a polymer-to-metal seal with the valve seat. The polymer-to-metal seal stops substantially all fluid flow through the bore and the flow path when the twist-to-open valve is closed. The valve body further includes an external connection feature disposed around the bore. The valve body comprises an external sealing surface.

Another aspect of the invention includes an air conditioner service fitting having a valve body with a threaded bore that forms a refrigerant introduction/removal flow path and an annular valve seat extending around the bore. A twist-to-open valve is disposed in the bore and is threadedly engaged with the valve body. The twist-to-open valve includes a valve element configured to form a polymer-to-metal seal with the valve seat and a valve housing. The valve body includes a quick-connect shoulder disposed around the bore. A first locking element is disposed within the valve body to restrain the twist-to-open valve from movement out of the bore. A valve core is disposed within the valve housing and operative selectively to open and close a flow path extending through the valve housing. A second locking element disposed within the twist-to-open valve to restrain the valve core from movement out of the valve housing;

The foregoing paragraphs have been provided by way of introduction, and they are not intended to limit the scope of the following claims.

DETAILED DESCRIPTION OF THE PRESENTLY PREFERRED EMBODIMENTS

Figure 1:
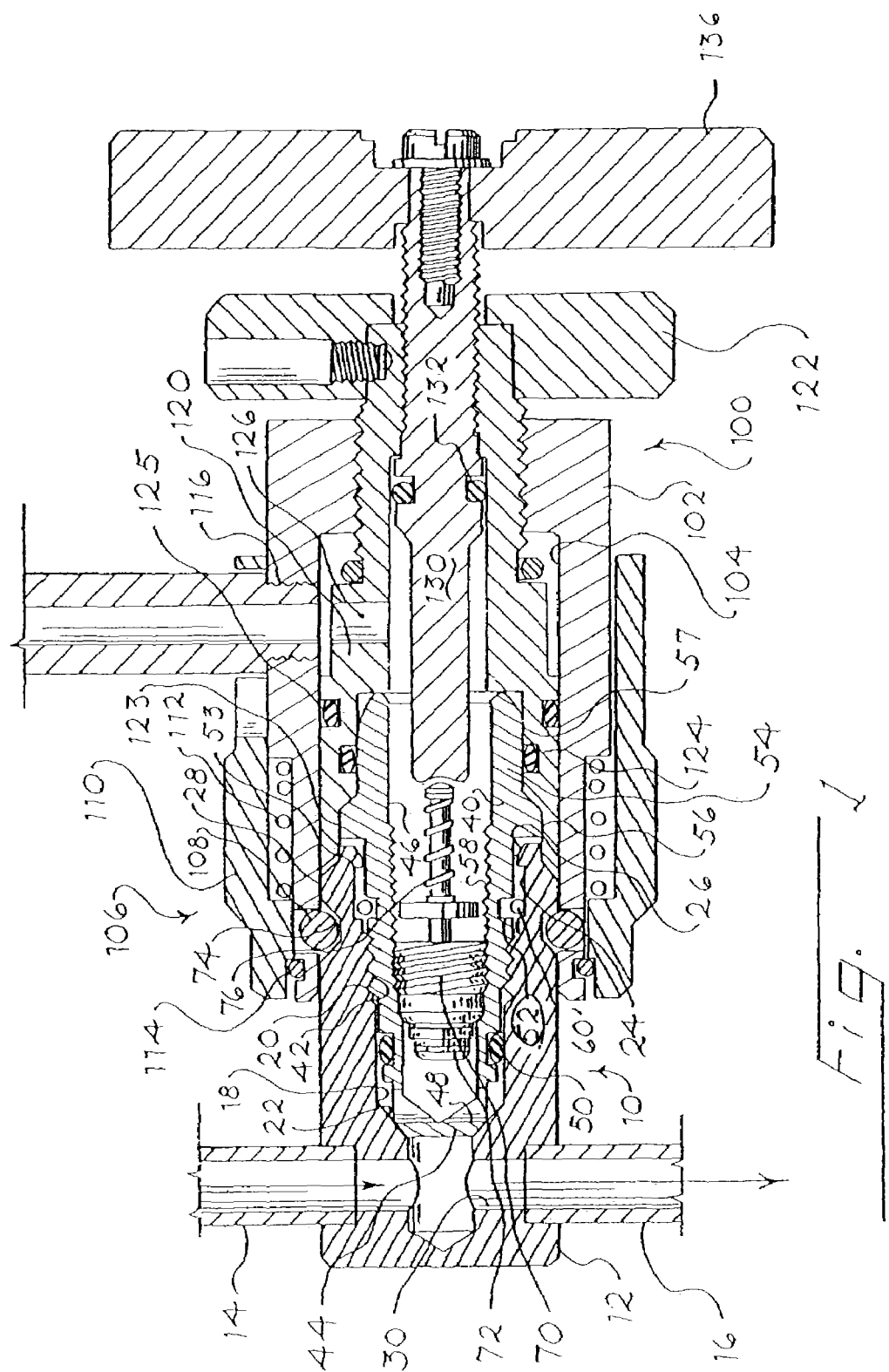
FIG. 1 is a cross sectional view of an air conditioner access fitting mated with an air conditioner service fitting that incorporate preferred embodiments.

Turning now to the drawings, FIG. 1 shows an access fitting 10 mated with a service fitting 100. The access fitting 10 includes a valve body 12 that defines a stepped, partially threaded bore 18 and a cross bore 30. The cross bore 30 receives air conditioner lines 14, 16, which can be secured to the valve body 12 in any convenient manner, as for example by brazing. The cross bore 30 interconnects the air conditioner lines 14, 16, and the cross bore 30 provides fluid communication between the air conditioner lines 14, 16 and the bore 18.

The bore 18 defines a set of internal threads 20 as well as an annular valve seat 22 that extends around the bore 18. The valve body 12 forms a recess 24 adjacent to an internal annular chamfer 26. The exterior surface of the valve body 12 forms a conventional quick release shoulder 28.

Figure 3:
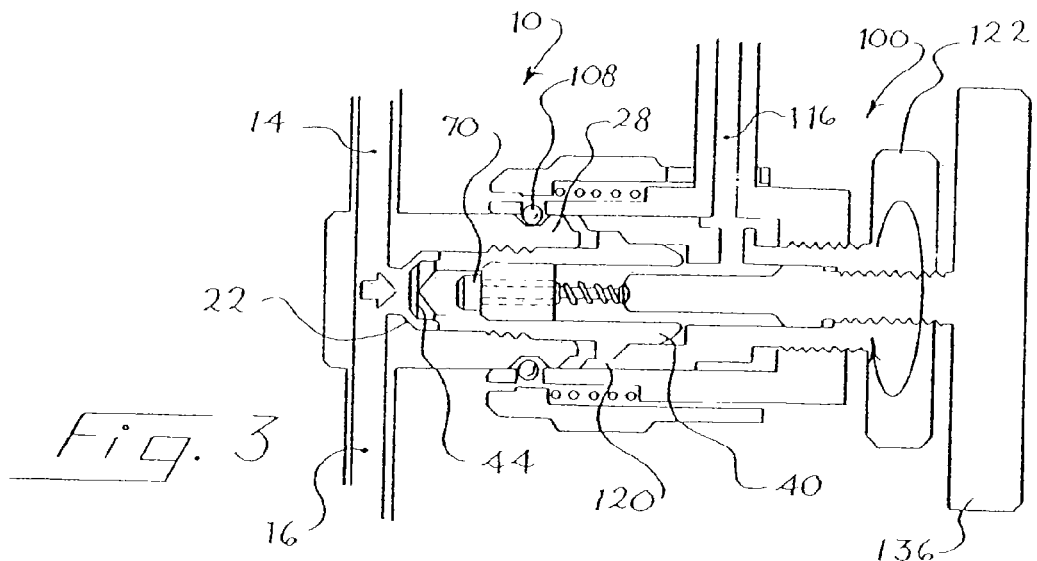
FIG. 3 is a schematic cross sectional view showing the fittings of FIG. 1 in a mated configuration, with the twist-to-open valve in an open position and the valve core in a closed position.
Figure 4:
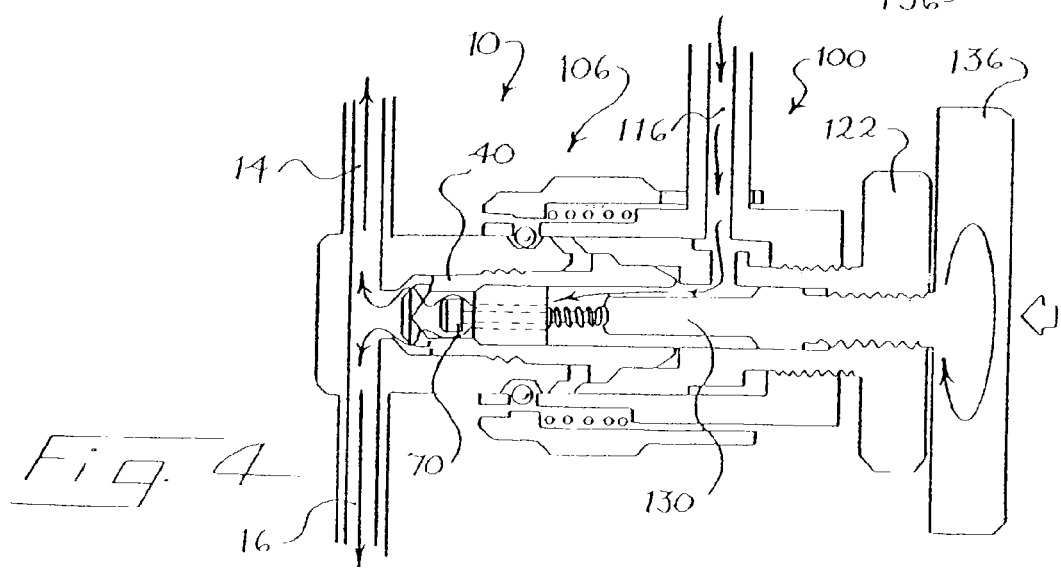
FIG. 4 is a schematic cross sectional view corresponding to FIG. 2, except that both the twist-to-open valve and the valve core are shown in the open position.

A twist-to-open valve 40 is mounted in the bore 18 of the valve body 12. The twist-to-open valve 40 defines a set of external threads 42 configured to mate with the internal threads 20. The end of the twist-to-open valve 40 closest to the cross bore 30 forms a frusto-conical valve element 44 configured to mate with the valve seat 22 when the twist-to-open valve 40 is in the closed position shown in FIG. 1. The twist-to-open valve 40 can be moved from the closed position of FIG. 1 to an opened position as shown in FIGS. 3 and 4 by rotating the twist-to-open valve 40 relative to the valve body 12 in an opening direction.

The twist-to-open valve 40 defines a second stepped bore 46 and a cross bore 48. When the twist-to-open valve 40 is in the opened position of FIGS. 3 and 4, the cross bore 30, the bore 18, the cross bore 48 and the second bore 46 cooperate to form a fluid path. This fluid path is closed in a substantially zero leakage manner when the twist-to-open valve 40 is positioned to the closed position of FIG. 1, with the valve element 44 in sealing, polymer-to-metal contact with the valve seat 22, respectively. In a preferred embodiment, the valve element is made from a polyimide such as VESPEL. In other embodiments, however, other high-tensile strength polymers that may withstand high temperatures and pressures may also be used, such as, by way of example a polyethelether ketone such as PEEK. The valve seat may be made from a variety of suitable metals. Examples include, but are not limited to, aluminum, steel, or brass.

A portion of the second bore 46 is formed with a set of internal threads 58. An O-ring 50 is mounted around the twist-to-open valve 40 to seal against the valve body 12 and to prevent the leakage of refrigerant between the twist-to-open valve 40 and the valve body 12 when the twist-to-open valve 40 is open.

The twist-to-open valve 40 also defines an external groove 52 and an end portion 54. The end portion 54 defines a set of wrench flats 56, which may be conventional, hexagonally arranged wrench flats. The end portion 54 also defines a cylindrical sealing surface 57.

A locking element 60 is mounted in the groove 52 of the twist-to-open valve 40. This locking element 60 in this preferred embodiment is a split ring sized to fit within the groove 52. The chamfer 26 assists in compressing the split ring on assembly of the twist-to-open valve 40 into the valve body 12. A shoulder 53 acts as a stop that prevents the locking element 60 and thereby the twist-to-open valve 40 from moving out of the valve body 12 once assembled. In this way, inadvertent disassembly of the twist-to-open valve 40 from the valve body 12 is prevented.

A valve core 70 is installed in the second bore 46. The valve core 70 may be substantially conventional, and the valve core 70 includes an elastomeric sealing element 72 connected to a stem 74. A spring 76 biases the sealing element 72 to a closed position.

As shown in FIG. 1, the access fitting 10 is preferably used with the service fitting 100. The service fitting 100 includes a generally cylindrical housing 102 that defines a recess 104 that opens out at one end of the housing 102.

The housing 102 supports a quick connect mechanism 106 that can be conventional. The quick connect mechanism 106 shown in FIG. 1 includes an array of balls 108 that are radially positioned by a collar 110. The collar 110 is mounted to slide axially along the housing 102, and is biased to the position of FIG. 1 by a spring 112. When the collar 110 is shifted to the right as shown in FIG. 1, the balls 108 are permitted to move radially outwardly to pass over the quick release shoulder 28 of the valve body 12. When the collar 110 is released, the spring 112 restores the collar 110 to the position of FIG. 1, where the collar 110 prevents the balls 108 from moving radially outwardly and thereby retains the housing 100 on the valve body 12. The collar 110 is prevented from moving excessively to the left as shown in FIG. 1 by a split ring 114. A passageway 116 extends through one side of the housing 102 and is provided to introduce refrigerant into the recess 104 or to remove refrigerant from the recess 104. The passageway 116 can be connected to a conventional refrigerant supply, pump, or tank (not shown).

A wrench 120 is mounted in the recess 104 for axial movement in the recess 104 as controlled by a first actuator 122. The wrench 120 includes wrench flats 123 configured to engage the wrench flats 56 described above. An O-ring 124 is mounted to the wrench 120 to seal against the sealing surface 57, and a bore 126 transmits refrigerant between the passageway 116 and the second bore 46. An O-ring 125 is mounted to the wrench 120 to seal against the housing 102.

In this embodiment, the first actuator 122 takes the form of a handle that is secured to an exposed end of the wrench. The wrench is threaded to the housing 102 as shown in FIG. 1 such that rotation of the first actuator 122 rotates the wrench flats 123 and simultaneously moves the wrench 120 axially in the recess 104.

The service fitting 100 also includes a valve core depressor 130 that in this embodiment takes the form of an elongated pin. The valve core depressor 130 is sealed in a bore of the wrench 120 by an O-ring 132. The valve core depressor 130 is threaded to the wrench 120, and a portion of the valve core depressor 130 extends beyond the first actuator 122 and is mounted to a second actuator 136. By manually rotating the second actuator 136, the valve core depressor 130 can be moved axially relative to the wrench 120, either to the left as shown in FIG. 1 to depress the stem 74 and open the valve core 70, or to the right as shown in FIG. 1 to allow the stem 74 to move to the right to close the valve core 70.

Figure 2:
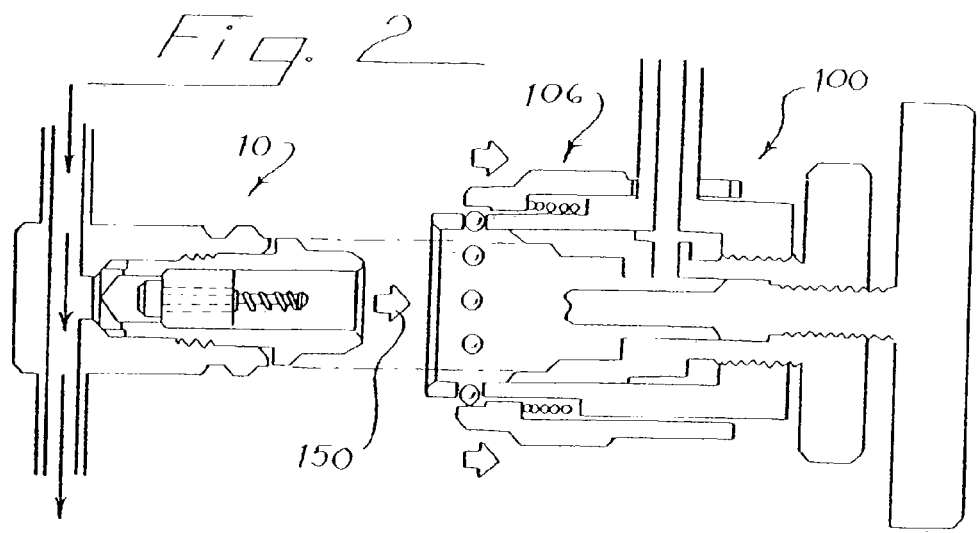
FIG. 2 is a schematic cross sectional view of the fittings of FIG. 1 prior to being mated together.

FIG. 2 shows the fittings 10, 100 prior to mating. The collar 110 has been moved to the right, and the fitting 10 can be moved in the direction of the arrow 150 to move the fitting 10 into the recess 104.

FIG. 3 provides a cross sectional view of the mated access fitting 10 and service fitting 100. Note that the balls 108 are received behind the quick release shoulder 28, thereby locking the access fitting 10 in the service fitting 100. In FIG. 2, the first actuator 122 has been rotated to rotate the wrench 120 and the twist-to-open valve 40 to open the polymer-to-metal seal formed between the valve element 44 and the valve seat 22, respectively. Even though this polymer-to-metal seal has been opened, refrigerant is not free to flow between the air conditioner lines 14, 16 and the passageway 116, because the valve core 70 remains closed.

In FIG. 4, the second actuator 136 has been used to move the valve core depressor 130 to the left, thereby opening the valve core 70. In FIG. 4, both the polymer-to-metal seal associated with the twist-to-open valve 40 and the seal associated with the valve core 70 are opened, and refrigerant is free to flow in either direction between the air conditioner lines 14, 16 and the passageway 116. Once the desired service procedure has been completed, the actuators 136, 122 can be used to close the valve core 70 and to close the twist-to-open valve 40, respectively. Then the service fitting 100 can be removed from the access fitting 10 by manipulating the quick release mechanism 106 in the conventional manner.

Of course, many changes and modifications can be made to the preferred embodiments described above. In one alternative embodiment, the redundant valve core 70 is not provided. Zero leakage is provided by the polymer-to-metal seal.

The wrench flats described above can be either internal or external wrench flats, and other out-of-round surfaces can be used. Thus, the term "wrench flat" is intended broadly to encompass any out-of-round surface (internal or external) that can be used to apply torques to the valve body 12 or the twist-to-open valve 40, and is not restricted to the specific form described above.

Figure 5:
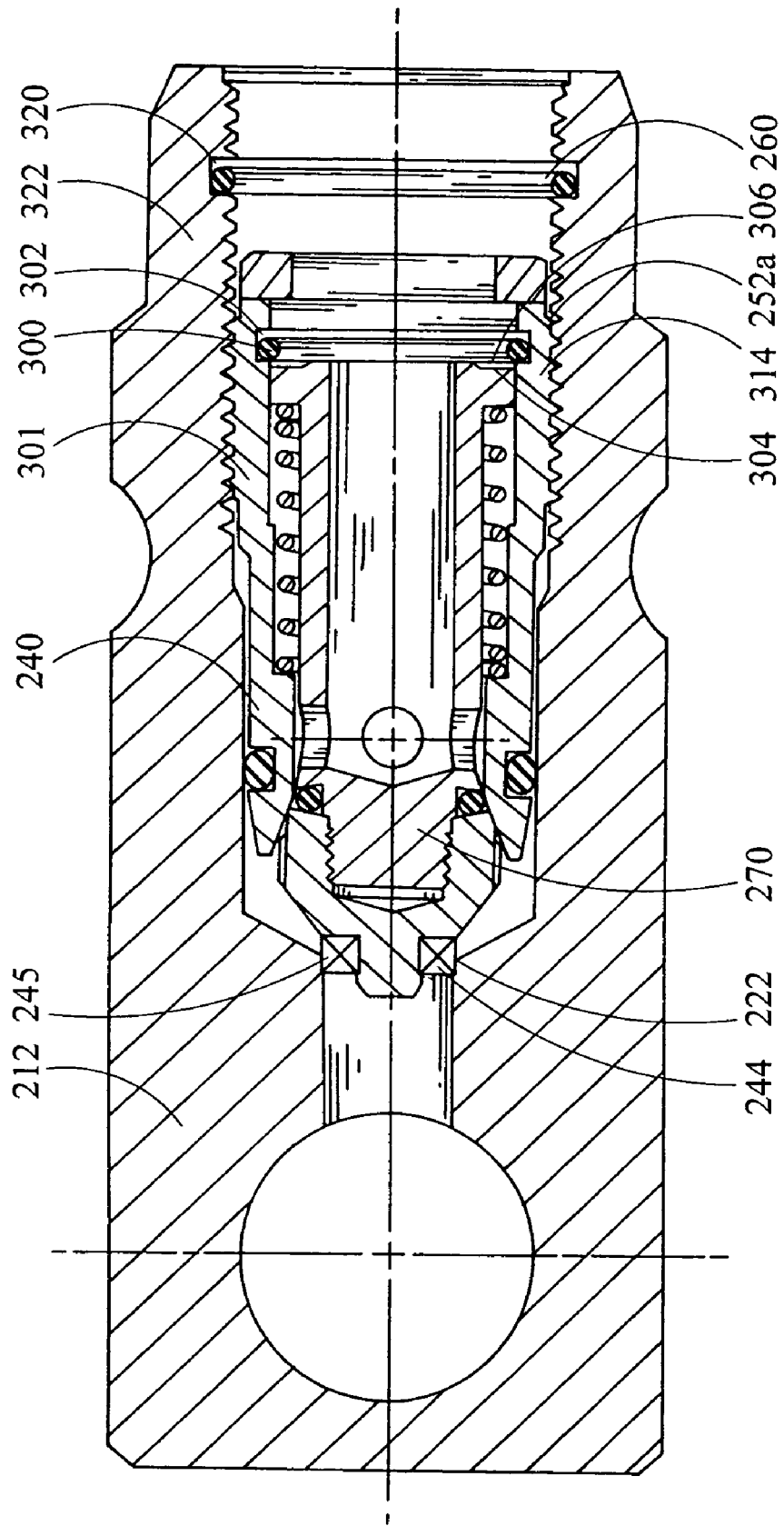
FIG. 5 is a cross sectional view of a second embodiment of the twist-to-open valve within the valve body in a closed position.
Figure 6:
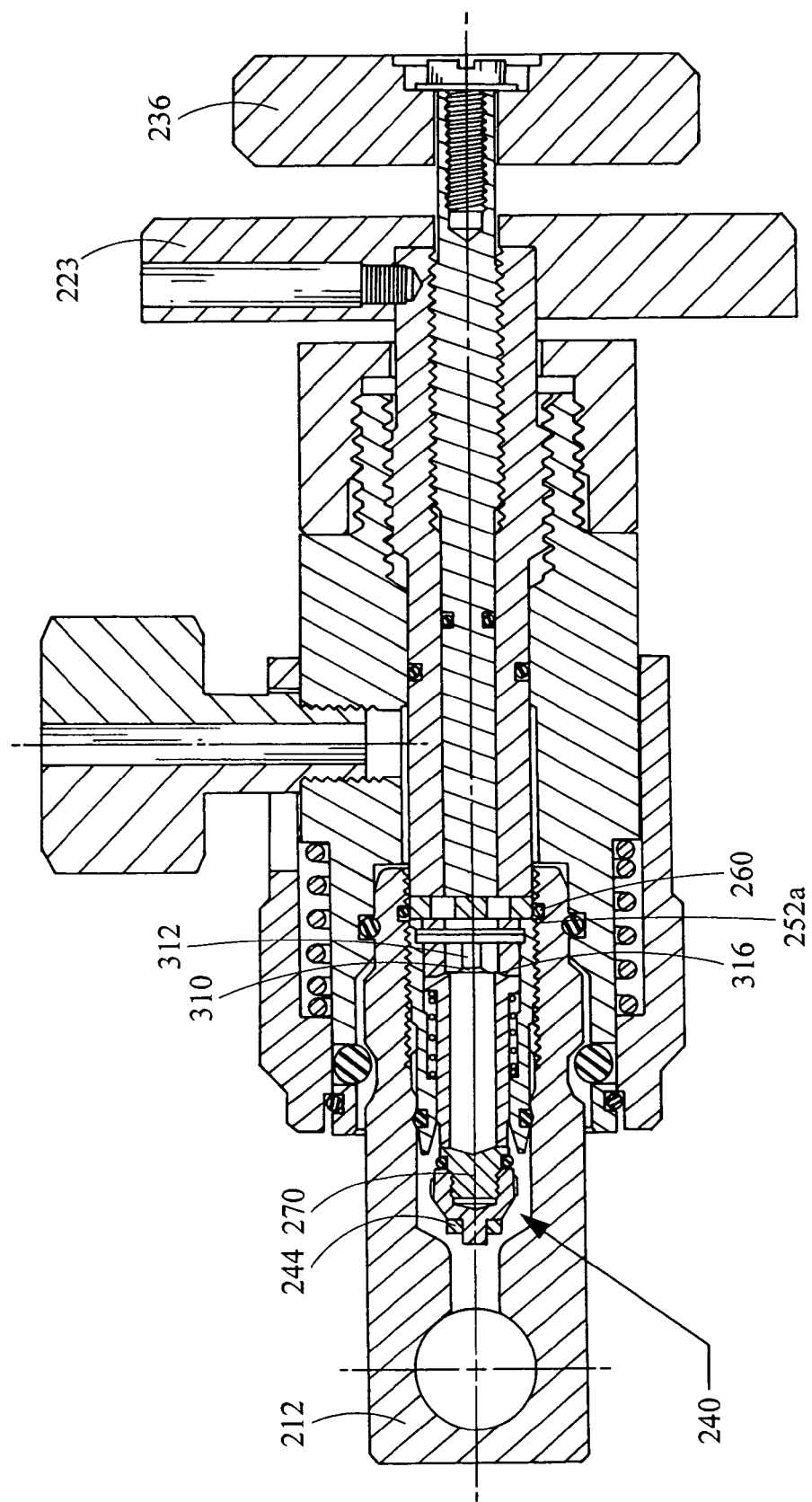
FIG. 6 is a cross sectional view of an air conditioner access fitting mated with an air conditioner service fitting showing the twist-to-open valve of FIG. 5 in an open position.

FIGS. 5 and 6 show a second embodiment of the twist-to-open valve 240 and the valve body 212. The operation of the valve 240 is basically the same, with differences noted below. As with the embodiments described above, the twist-to-open valve 240 includes a valve core 270 disposed within a valve housing 301 and a valve element 244 in sealing, polymer-to-metal contact with a valve seat 222. The polymer used may be chosen from those described for the embodiments above. Preferably, a square seal 245 has been used to form the polymer-to-metal seal, although other seals of other types and shapes, such as that used with the twist-to-open valve described above, may also be used.

A first locking element 260 is provided and is mounted inside a slot 320 in the valve body 212 at an end 322 opposite the valve element 244 of the twist-to-open valve 240. As with the locking elements 60, 260 described above, the first locking element 260 is a split ring sized to fit within the slot 320. When the polymer-to-metal seal is broken and the twist-to-open valve 240 is opened, an uppermost external thread 252a of the twist-to-open valve 240 acts as a stop that prevents the first locking element 260 and thereby the twist-to-open valve 240 from moving out of the valve body 212 once assembled (see FIG. 6). In this way, inadvertent disassembly of the twist-to-open valve 240 from the valve body 212 is prevented.

A second locking element 300 is mounted within a slot 302 within the twist-to-open valve 240 at an end 314 of the valve 240 opposite the valve element 244. As with the locking elements 60, 260 described above, the second locking element 300 is a split ring sized to fit within the slot 302. A chamfer 304 on a shoulder 306 assists in compressing the split ring on assembly of the valve housing 301 and valve core 270. The shoulder 306 acts as a stop that prevents the valve core 270 from moving out of the valve housing 301 when the twist-to-open valve is opened. In this way, inadvertent disassembly of the valve core 270 from the valve housing 301 is prevented. Note that in alternate embodiments, the second locking element need not be present, and that the second locking element acts in a redundant manner with respect to the first locking element.

As with the embodiments described above and as shown in FIG. 6, first and second actuators 223, 236 may be used to open the polymer-to-metal seal and the valve core 270, respectively. In this embodiment, the first actuator 223 acts upon the valve core 270 to open the polymer-to-metal seal between the valve element 244 and valve seat 222. Instead of using a wrench, a receptacle 310 preferably is provided at and end 316 of the valve core 270 opposite the valve element 244 to receive a fitting 312 that is attached to the first actuator 223. Thus, when the first actuator is actuated, the fitting 312 applies a "twisting" motion to the valve core 270, causing the polymer-to-metal seal to open. FIG. 6 shows the twist-to-open valve 240 in an open position. Note that, as with the embodiments described above, refrigerant is not free to flow because the valve core 270 remains closed. To open the valve core 270, the second actuator 236 is used to act upon the valve core 270 in the manner described above.

The actuators described above are manual handles. These handles can take any desired shape or configuration. Also, actuators suitable for use with this invention include motorized actuators including rotary motors, solenoids, hydraulic cylinders, and the like. Thus, the term "actuator" is intended broadly to encompass any manual or motorized device for imparting movement along the desired axis. Linear movement is encompassed as well as rotary movement.

The term "service fitting" is intended broadly to encompass a fitting used for any air conditioner service operation, including refrigerant charging, reclaiming and service.

The term "air conditioner system" is intended broadly to encompass any refrigerant system, and is not limited to air conditioner systems for vehicles.

Materials for the access fitting 10 and the service fitting 100 can be chosen as appropriate for the particular application. For example, the materials of Table 1 have been found suitable.

TABLE 1

| Element | Material |
| --- | --- |
| valve body 12 | stainless steel |
| twist-to-open valve 40 | brass |
| housing 102 | stainless steel |
| wrench 120 | steel |
| valve core depressor 130 | steel |

The embodiments described above provide a number of important advantages. The higher-tensile strength polymer-to-metal seal provided by the twist-to-open valve 40 provides a substantially zero leakage rate in service. The leakage rate is not limited by the diffusion rate of refrigerant through elastomeric seals commonly used for system access valves in the past. This zero leakage feature is increasingly important as worldwide demand increases for reduced atmospheric emissions from motor vehicles and industrial equipment.

Moreover, the polymer-to-metal seal helps to prevent damage to the valve body and to prevent deformation-type failures to the metal. In addition, if the seal is for some reason damaged, it may easily be replaced without replacing the entire valve.

The twist-to-open and close actuation of the valve provides high closure force on the polymer and metal sealing surfaces with minimal effort.

The redundant valve core helps assure that the access fitting is not inadvertently opened and that refrigerant is thus not released into the atmosphere. Access to the air conditioner system requires both that the twist-to-open valve be twisted to open it and that the valve core be depressed. These actions are unlikely to be inadvertently accomplished simultaneously.

The presence of the locking element(s) assists in preventing the valve from being fully unscrewed from the valve body in the event the valve is improperly over-rotated, thus minimizing the occurrence of an uncontrolled release of refrigerant and the possible release of the fitting as a projectile.

The service fitting provides the important advantage that mechanisms are provided for rotating the twist-to-open valve and for depressing the valve core, all without interrupting the operation of the conventional quick connect mechanism.

The access fitting is well suited for use with next-generation air conditioning systems utilizing carbon dioxide as the refrigerant. Such systems have high requirements for emission integrity and very high operating pressure and temperature. This access fitting is of course suitable for use with air conditioner systems that use other refrigerants. The access fitting can be used on either the high pressure side or the low pressure side of an air conditioner system.

The foregoing detailed description has described only a few of the many forms that this invention can take. For this reason, this detailed description is intended only by way of illustration, and not by way of limitation. It is only the following claims, including all equivalents, which are intended to define the scope of this invention.

The invention claimed is:

1. An air conditioner access fitting comprising:
a valve body comprising a threaded bore and an annular valve seat extending around the bore, the valve body configured and the valve seat positioned such that all fluid that passes through the bore crosses the valve seat;
a twist-to-open valve disposed in the bore and threadedly engaged with the valve body, the valve comprising a second bore in fluid communication with the valve seat and a valve element configured to form a polymer-to-metal seal with the valve seat, the polymer-to-metal seal stopping substantially all fluid flow through the bore and the flow path when the twist-to-open valve is closed;
a valve core disposed in the second bore and operative selectively to open and close a flow path extending through the second bore, the valve core including a receptacle opposite the valve element, the receptacle for receiving a fitting to open the polymer-to-metal seal; and
the valve body further comprising a quick-connect shoulder disposed around the bore.

2. The air conditioner access fitting of claim 1 wherein the twist-to-open valve comprises an end portion opposite the valve element, the end portion extending out of the valve body and comprising a plurality of wrench flats.

3. The air conditioner access fitting of claim 1 further comprising:
a first locking element disposed between the valve body and the twist-to-open valve to restrain the twist-to-open valve from movement out of the bore.

4. The air conditioner access fitting of claim 1 wherein the twist-to-open valve further comprises a second locking element disposed between the valve core and the remainder of the twist-to-open valve at an end opposite the valve element to restrain the valve core from movement out of the remainder of the twist-to-open valve.

5. The air conditioner access fitting of claim 3 or 4 wherein the locking element comprises a split ring.

6. The air conditioner access fitting of claim 5 wherein the valve body comprises:
an inwardly-facing chamfer adjacent an open end of the bore, the chamfer configured to compress the split ring at assembly; and
an annular recess positioned to receive the split ring, the recess positioned to allow the split ring to move along the bore to accommodate movement of the twist-to-open valve between closed and opened positions, the recess terminating in a shoulder positioned to prevent the split ring from moving beyond the shoulder toward the chamfer.

7. The air conditioner access fitting of claim 1 wherein the polymer of the polymer-to-metal seal comprises a polyimide.

8. The air conditioner access fitting of claim 1 wherein the polymer of the polymer-to-metal seal comprises polyethelether ketone.

9. The air conditioner access fitting of claim 1 wherein the valve body comprises a body portion configured for connection to an air conditioner system, wherein the twist-to-open valve comprises a set of external threads that threadedly engage the bore, and wherein the valve seat is disposed between the body portion and the external threads.

10. An air conditioner service fitting comprising:
a valve body comprising a threaded bore and an annular valve seat extending around the bore, the valve body configured and the valve seat positioned such that all fluid that passes through the bore crosses the valve seat;
a twist-to-open valve disposed in the bore and threadedly engaged with the valve body, the valve comprising a valve housing and a valve element configured to form a polymer-to-metal seal with the valve seat, the polymer-to-metal seal stopping substantially all fluid flow through the bore and the flow path when the twist-to-open valve is closed;
the valve body further comprising an external connection feature disposed around the bore;
a first locking element disposed within a first slot in the twist-to-open valve to restrain the valve core from movement out of the valve housing;
a valve core disposed within the valve housing and operative selectively to open and close a flow path extending through the valve housing;
a second locking element disposed within the twist-to-open valve to restrain the valve core from movement out of the valve housing;
wherein the valve body comprises an external sealing surface.

11. The air conditioner access fitting of claim 10, wherein the twist-to-open valve further comprises an external thread that engages the first lock element to restrain the twist-to-open valve from movement out of the bore when the polymer-to-metal seal is open.

12. The air conditioner access fitting of claim 10 wherein the first lock element comprises a split ring.

13. The air conditioner access fitting of claim 10 wherein the twist-to-open valve further comprises a shoulder that engages the second lock element to restrain the valve core from movement out of the valve housing when the twist-to-open valve is open.

14. The air conditioner access fitting of claim 10 wherein the second lock element comprises a split ring.

15. The air conditioner access fitting of claim 10 wherein the valve core further comprises a receptacle opposite the valve element, the receptacle for receiving a fitting to open the polymer-to-metal seal.

16. The air conditioner access fitting of claim 15 further comprising a first actuator attached to the receptacle for opening the polymer-to-metal seal.

17. The air conditioner access fitting of claim 16 wherein the first actuator further comprises a manual handle.

18. The air conditioner access fitting of claim 10 further comprising a second actuator attached to an end of the valve core for opening the valve core.

19. The air conditioner access fitting of claim 18 wherein the second actuator further comprises a manual handle.

20. The air conditioner access fitting of claim 10 wherein the polymer of the polymer-to-metal seal comprises a polyimide.

21. The air conditioner access fitting of claim 10 wherein the polymer of the polymer-to-metal seal comprises polyethelether ketone.

22. An air conditioner service fitting comprising:
  a valve body comprising a threaded bore that forms a refrigerant introduction/removal flow path and an annular valve seat extending around the bore;
  a twist-to-open valve disposed in the bore and threadedly engaged with the valve body, the valve comprising a valve element configured to form a polymer-to-metal seal with the valve seat and a valve housing;
  the valve body further comprising a quick-connect shoulder disposed around the bore;
  a first locking element disposed within the valve body to restrain the twist-to-open valve from movement out of the bore;
  a valve core disposed within the valve housing and operative selectively to open and close a flow path extending through the valve housing; and
  a second locking element disposed within the twist-to-open valve to restrain the valve core from movement out of the valve housing.

23. The air conditioner service fitting of claim 22 wherein the first and second locking elements each comprises a split ring.

24. The air conditioner service fitting of claim 22 wherein the valve core further comprises a receptacle opposite the valve element, the receptacle for receiving a fitting to open the polymer-to-metal seal.

* * * * *